Feb. 11, 1969　　　E. K. JOHNE　　　3,426,374
METHOD AND DEVICE FOR CONGREGATING BEE COLONIES
Filed May 17, 1966

INVENTOR
ERNST KURT JOHNE
BY
Burgess, Dinklage + Sprung
ATTORNEYS

United States Patent Office 3,426,374
Patented Feb. 11, 1969

3,426,374
METHOD AND DEVICE FOR CONGREGATING BEE COLONIES
Ernst Kurt Johne, c/o Riverdale Country School for Girls, New York, N.Y. 10471
Filed May 17, 1966, Ser. No. 550,771
U.S. Cl. 6—1      6 Claims
Int. Cl. A01k 47/00, 47/06

ABSTRACT OF THE DISCLOSURE

Bee hive complex for combining two or more bee colonies with separate queens having the separate hives interconnected by a confined path provided with at least one reversed bend and a queen excluder. The reversed bend in the interconnecting path forces a bee to detour in travelling between the hives, so disorienting and irritating the bee that it will not attack the queen of the entered hive and will not itself be attacked, even though a native of the other hive.

---

Bee colonies can be kept in bee hives of different types. One of the most commonly used bee hive systems is in principle a rectangular box which contains a number of frames. These frames are used by the bees for building their cells. A specific type of bee hives operating according to this system is called the Langstroth Frame and Hive. This system is for example described in great detail in The ABC and XYZ of Bee Culture, A. I. Root, The A. I. Root Company (1950), on page 335.

A bee colony normally consists of a number of worker bees, drones and a queen bee. It is a well known fact that one bee colony will tolerate only one queen bee and any foreign queen will be attacked and possibly killed. Therefore it is normally impossible to combine two or more bee colonies in one bee hive or one bee hive complex as one of the queens would immediately be attacked and killed. Different kinds of two-queen systems have been tried but without any success. The different methods hitherto used are for example described in The ABC and XYZ of Bee Culture, A. I. Root, The A. I. Root Company (1950), on pages 554 and 555.

It is an object of this invention to provide a method and a device that enables two or more bee colonies to be combined so that they operate as a single unit. This has considerable advantages for the bee keeper as he only has to supervise the combined unit instead of the individual hives, and it saves a considerable amount of work as any action taken with respect to one of the combined colonies will automatically have an effect on the other colonies in the combination. This combination has in addition a beneficial effect on the bee colonies themselves as differences in the number of individuals in the bee colonies will be adjusted automatically. This prevents effectively the swarming of a bee colony and raises its efficiency, resulting in an increased honey production. A further effect of my system is to assure that a great number of young bees are present at the beginning of the winter which is very important for the wintering of the hive. The advantages of such a combination are well known and are described in great detail in The ABC and XYZ of Bee Culture, A. I. Root, The A. I. Root Company (1950), on pages 555 and 556.

As pointed out, the combination of more than one bee colony cannot be effected by arranging two or more bee hives adjacent to one another and opening a direct passage between these bee hives as this would result in the killing of the queens. I have now found that combining two or more bee hives is possible under certain conditions.

According to my invention all the queens stay alive until the bee colonies are united to form one colony, i.e. until an unrestricted passage between the two or more colonies is opened or until two colonies are placed in one hive. I have observed that according to my system all the queens in the combined hives are still alive as late as the month of November.

My invention is illustrated in the accompanying drawings, wherein.

Figure 1:
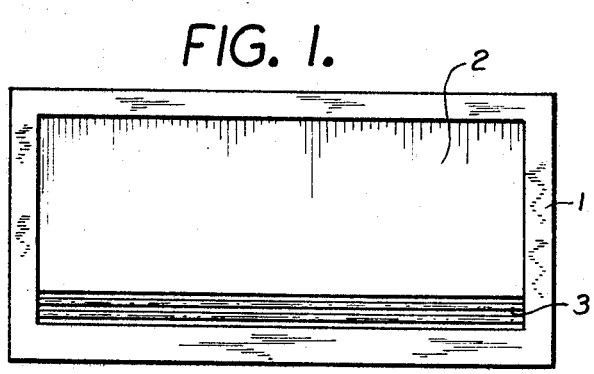
FIG. 1 shows a wall panel which is used in combining two bee hives.

All the figures will be explained in more detail hereinafter.

More specifically, my invention comprises a bee hive complex comprising at least two bee hives positioned adjacent to one another and means defining a confined path therebetween interconnecting them, said path having at least one reverse bend and containing means to prevent the passage of an object of the size of a queen bee therethrough, but allowing the passage of smaller objects, i.e., worker bees. This device which prevents the passage of a queen bee is commonly called a queen excluder and is known in the art. This queen excluder may be a grating having openings of about 0.163" in width. This is described in detail in The ABC and XYZ of Bee Culture, A. I. Root, The A. I. Root Company (1950), on page 221.

Normally a bee hive has an opening in its lower part, a so-called bee entrance which allows worker bees to leave the hive and collect food. This collecting is carried out by bees in a certain state of development and of a certain age. These bees are especially aggressive against foreign queen bees. They normally remain in the lower part of the bee hive, i.e., adjacent to the bee entrance. Consequently the beginning of the passage from one bee hive to the next one is preferably positioned in the upper part of the hive. The upper part of the bee hive is normally not inhabited by field bees but by those which stay in the hive and are not as aggressive against foreign queens.

More specifically my invention thus includes a bee hive complex comprising at least two rectangularly shaped bee hives positioned adjacent to one another, having a slot in the side walls facing each other, said slot being positioned adjacent and parallel to the upper edge of said bee hives and being separated by a rectangular wall panel of the same size and shape as the wall of the bee hive which rectangular wall panel has a slot adjacent and parallel to its lower edge, said slot of the rectangular wall panel being closed by a grating which allows only the passage of objects smaller than a queen bee through said grating. This arrangement of slots provides a connecting passage between the two bee hives, which has a reverse bend. This reverse bend forces a bee to make a detour in travelling from one hive to the next one. It is thus disoriented and irritated. Surprisingly it is not attacked in the new bee hive it enters and does itself not attack the queen of the entered hive. It is of course possible to connect more than two bee hives in this manner. For practical purposes it has proved advantageous to connect two or three hives or colonies in this way, but this method may be used to connect up to five hives with advantage.

In a preferred embodiment the bee hive complex is built in the following way: The individual bee hive used has the usual rectangular form. In one or both side walls this bee hive has a slot of about 9/16" in width, which runs parallel to its upper edge and at a distance of about 1" from this edge. The length of this slot is defined by the depth of the hive. This bee hive is positioned adjacent to an identical second hive so that the two slots of both bee hives coincide. In between the two hives a wall panel is inserted having the same size and shape as the walls of the bee hive, i.e., a rectangular form. This panel has a protruding rim which completely fills the space left between the two hives, and a recessing middle portion. It further has a slot of ½ to 1" in width which is positioned parallel to its lower edge and is at a distance of about 2" from that edge. The slot is filled with a grating of an appropriate width to prevent the passage of queen bees. This arrangement defines a passage between the two hives which forces a bee travelling from one hive to the other one first to pass the slot in the hive it leaves, then turn downward, pass the slot in the wall panel and the grating in this slot, turn upward and pass the slot in the bee hive it wants to enter.

Figure 2:
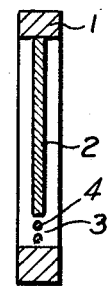
FIG. 2 shows the same wall panel in cross-section.

One of the essential parts of the invention thus is the wall panel connecting the two bee hives. This is a wall panel for combining two bee hives having a protruding rim, a recessed central portion and a slot containing a grating which allows the passage of objects smaller than a queen bee, a so-called queen excluder. A specific embodiment of this panel is shown in FIG. 1. In this figure, 1 designates the protruding rim, 2 the recessed central portion and 3 the slot with the grating. FIG. 2 shows the same wall panel in cross-section, 4 indicating the grating.

Figure 3:
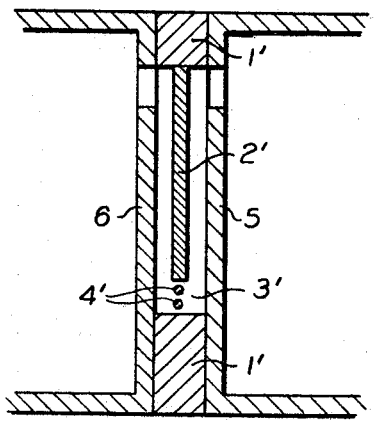
FIG. 3 shows a cross-sectional view of this wall panel inserted between two bee hives.

FIG. 3 shows this wall panel inserted between two bee hives. 5 and 6 indicate the walls of the adjacent bee hives, the middle section of the drawing shows the same wall panel as in FIG. 2, 1' indicating the protruding rim, 2' the recessed central portion, 3' the slot and 4' the grating in the slot.

Figure 4:
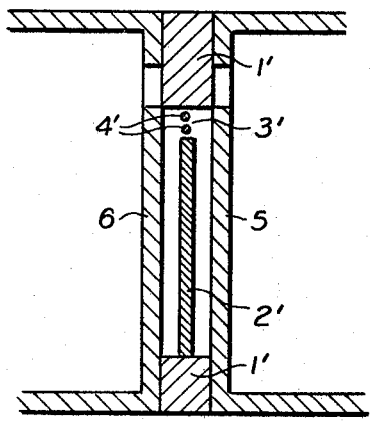
FIG. 4 shows the wall panel inserted upside down.

FIG. 4 is the same as FIG. 3 and the numerals have the same meaning. The only difference is that the wall panel has been inserted upside down. As can be seen very easily from the drawing, in this case the passage between the two bee hives is closed for separating the hives at times when the colonies are not to be combined. In the embodiment depicted in FIGS. 3 and 4 the opening and closing of the passage between the two bee hives is thus effected simply by inverting the intermediate wall panel.

Figure 5:
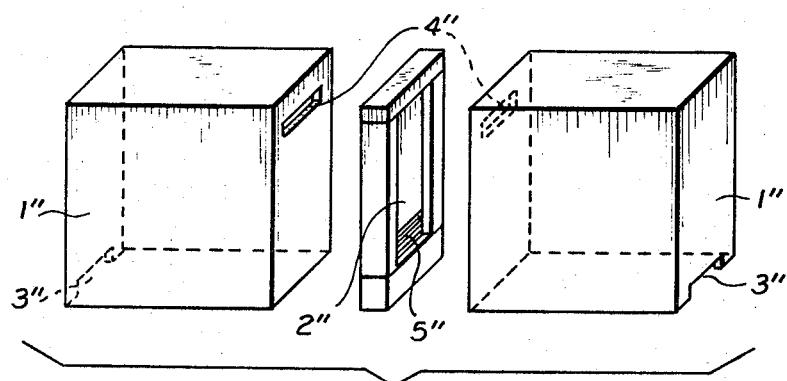
FIG. 5 shows an exploded view of the wall panel inserted between two bee hives.

FIG. 5 shows an exploded view of the wall panel inserted between two bee hives. 1" designates the two bee hives, 2" designates the inserted wall panel, 3" are the bee entrances of the two bee hives, 4" the slots in the sides of the two bee hives which define the beginning of the confined interconnecting path and 5" is the slot in the inserted wall panel which contains the queen excluder means.

What is claimed is:

1. A beehive complex comprising at least two beehives positioned adjacent to one another, each of which hives has a side wall facing each other, which side walls have facing apertures positioned adjacent to the upper edge of said hive and having a wall panel of substantially the same size and shape as the wall of said beehive separating said side walls and defining passages between such wall panel, each of such side walls and means defining an aperture adjacent to the lower edge of said wall panel which aperture has means thereacross allowing only the passage of objects smaller than a queen bee therethrough.

2. A wall unit for combining at least two beehives, which unit is hollow and contains means defining a reverse-bend path, which path extends between two apertures, each of which apertures is adjacent to an end of said wall unit and is adapted for communication with a separate and distinct beehive, which wall unit contains a queen-bee excluder means within said passage.

3. A wall unit as claimed in claim 2 having side panels and ends and defining a space within said wall panel between said side panels and said ends; a partition within said space substantially separating such into two spaces, each of which is between said partition and one of said panels; means communicating between said spaces, and wherein said apertures are in each of said side panels adjacent to an end thereof, each of which apertures communicates with each of said spaces, wherein said communicating means is so disposed in relation to said aperture as to define a reverse bend passage from aperture to aperture through said spaces and said communicating means.

4. A wall panel as claimed in claim 3, wherein said partition-bounded aperture has a screen thereacross having openings of about 0.163 inch.

5. A beehive complex comprising at least two hives adjacent to each other, which hives have a common wall therebetween which is a wall panel as claimed in claim 3, wherein the side panels of said wall panel define the adjacent walls of said hives.

6. Method for combining at least two bee colonies, each of which colonies has a queen bee, which comprises providing said colonies adjacent to one another; providing a passageway between adjacent colonies; providing a queen-bee excluder in such passageway; and providing said passageway with at least one reverse bend therein, which reverse bend serves to disorient bees travelling through said passageway.

References Cited

UNITED STATES PATENTS 483,137   9/1892   Conser _____ 6—4.2

FOREIGN PATENTS 657,715   1/1929   France.
325,980   9/1920   Germany.
217,158   1/1942   Switzerland.

LUCIE H. LAUDENSLAGER, *Primary Examiner.*

U.S. Cl. X.R.

6—4